United States Patent
Boudreau et al.

(10) Patent No.: US 9,253,702 B2
(45) Date of Patent: Feb. 2, 2016

(54) HANDOVER IN HETEROGENEOUS RADIO COMMUNICATION NETWORKS BASED ON SYSTEMATIC IMBALANCE DIFFERENCES

(75) Inventors: Gary David Boudreau, Kanata (CA); Konstantinos Dimou, Stockholm (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 0 days.

(21) Appl. No.: 13/604,773

(22) Filed: Sep. 6, 2012

(65) Prior Publication Data
US 2014/0066066 A1    Mar. 6, 2014

(51) Int. Cl.
*H04W 36/30*    (2009.01)
*H04W 36/04*    (2009.01)

(52) U.S. Cl.
CPC .............. *H04W 36/30* (2013.01); *H04W 36/04* (2013.01)

(58) Field of Classification Search
CPC . H04W 76/028; H04W 76/046; H04W 16/16; H04W 36/04; H04W 36/30; H04W 36/088
USPC .......................... 455/436–444, 453; 370/331
See application file for complete search history.

(56) References Cited

U.S. PATENT DOCUMENTS

| | | | |
|---|---|---|---|
| 5,487,174 A | 1/1996 | Persson | |
| 5,862,489 A | 1/1999 | Aalto | |
| 5,898,928 A | 4/1999 | Karlsson et al. | |
| 5,970,407 A | 10/1999 | Brunner et al. | |
| 5,987,055 A | 11/1999 | Duque-Anton et al. | |
| 6,134,440 A | 10/2000 | Black | |
| 6,134,444 A * | 10/2000 | Kotzin | 455/453 |
| 6,233,222 B1 | 5/2001 | Wallentin | |
| 6,377,805 B1 | 4/2002 | Anvekar et al. | |
| 6,597,705 B1 | 7/2003 | Rezaiifar et al. | |
| 6,671,512 B2 | 12/2003 | Laakso | |
| 6,735,436 B1 | 5/2004 | McCauley et al. | |
| 7,103,364 B2 | 9/2006 | Ishikawa et al. | |
| 7,187,664 B2 | 3/2007 | Hiltunen | |
| 7,248,873 B2 * | 7/2007 | Lehtinen et al. | 455/436 |
| 8,515,415 B2 * | 8/2013 | Dimou et al. | 455/423 |
| 8,537,774 B2 * | 9/2013 | Robson et al. | 370/331 |
| 2001/0053139 A1 * | 12/2001 | Zimmermann et al. | 370/332 |
| 2002/0187784 A1 * | 12/2002 | Tigerstedt et al. | 455/439 |
| 2003/0072294 A1 | 4/2003 | Wei et al. | |
| 2005/0111389 A1 * | 5/2005 | Dick et al. | 370/278 |
| 2007/0010253 A1 | 1/2007 | Gunnarsson et al. | |

(Continued)

FOREIGN PATENT DOCUMENTS

WO    01/01720 A1    1/2001

OTHER PUBLICATIONS

IEEE Document: On the Use of Uplink received signal strength measurement for handover by Konstantinos D. Dimou and Anders Furuskar Dated 2008.*

(Continued)

*Primary Examiner* — Nizar Sivji
(74) *Attorney, Agent, or Firm* — Patent Portfolio Builders PLLC

(57) ABSTRACT

Presented is an apparatus and methods for determining if a determined systematic imbalance difference between a serving base station and one or more candidate base stations exceeds a threshold value and, if so, then using uplink information as part of a handover mechanism. The selective usage of uplink information in the handover mechanism can improve handover performance without unduly adding to complexity and signaling overhead.

23 Claims, 5 Drawing Sheets

(56) References Cited

U.S. PATENT DOCUMENTS

| | | | |
|---|---|---|---|
| 2010/0184437 A1* | 7/2010 | Dimou et al. | 455/436 |
| 2011/0019532 A1* | 1/2011 | Jung et al. | 370/216 |
| 2011/0136478 A1* | 6/2011 | Trigui | 455/418 |
| 2011/0312319 A1 | 12/2011 | Lindoff et al. | |
| 2012/0258724 A1* | 10/2012 | Kim et al. | 455/452.2 |
| 2013/0203430 A1* | 8/2013 | Gan et al. | 455/450 |

OTHER PUBLICATIONS

IEEE Document: Generic Link Layer: A solution for multi-radio transmission diversity in communication network beyond 3G by Konstantinos Dimou, Ramon Aguero, Marcin Bortnik, Reza Karimi, Georgios P. Koudoridis Dated 2005.*

International Search Report and Written Opinion of the International Searching Authority in corresponding International Application No. PCT/IB2013/001916 mailed Mar. 7, 2014.

Konstantinos D. Dimou, et al.; "On the Use of Uplink Received Signal Strength Measurements for Handover"; IEEE, 978-1-4244-1645; Ericsson Research, Ericsson AB; May 2008; pp. 2567-2471; Stockholm, Sweden.

LTE Advanced—3GPP, 3GPP TS 36.211 V12.1.0 Technical Specification; 3rd Generation Partnership Project; Technical Specification Group Radio Access Network; Evolved Universal Terrestrial Radio Access (E-UTRA); Physical channels and modulation; Release 12; Mar. 2014; pp. 1-120; Valbonne, France.

LTE Advanced—3GPP, 3GPP TS 36.331 V12.1.0 Technical Specification; 3rd Generation Partnership Project; Technical Specification Group Radio Access Network; Evolved Universal Terrestrial Radio Access (E-UTRA); Radio Resource Control (RRC); Protocol specification; Release 12; Mar. 2014; pp. 1-356; Valbonne, France.

* cited by examiner

HANDOVER IN HETEROGENEOUS RADIO COMMUNICATION NETWORKS BASED ON SYSTEMATIC IMBALANCE DIFFERENCES

TECHNICAL FIELD

The present invention relates generally to the handover process for wireless communications systems and more specifically to determining handover in heterogeneous networks based on systematic imbalance differences.

BACKGROUND

Typically, in the most recent wireless communication systems, a handover of user equipment (UE) from one base station (BS) to another base station is based on the characteristics of downlink communications between the user equipment and the current base station associated with the user equipment (serving base station), as compared to the characteristics of downlink communications which could be obtained with other, neighboring base stations (target or candidate base stations). In traditional radio communication network implementations, the network was typically homogeneous, i.e., all of the base stations used in a particular network were identical, or nearly identical, in their implementation and radio characteristics. Accordingly, the characteristics of neighboring base stations did not vary significantly and investigations into aspects other than those associated with the downlink, e.g., including uplink communication characteristics, for making the handover decision led to little or no improvement in return for the increased complexities and bandwidth required for performing the uplink analysis. Consequently, including uplink characteristics in the handover decision was generally not used in network implementations due, for example, to the cost in terms of signaling overhead associated with performing such additional measurements and communicating them through the network in return for relatively slight improvement in handover decisions.

For example, in the paper entitled "On the Use of Uplink Received Signal Strength Measurements for Handover", by Konstantinos Dimou and Anders Furuskar, IEEE 2008, pp. 2567-2571, the authors explored the potential desirability of considering uplink information in the context of handover decisions given that some base stations in homogenous networks exhibited a so-called "systematic imbalance", i.e., the condition that the average path gain is different in the downlink and the uplink of the same radio connection for a particular user equipment to a particular base station. This condition is also sometimes referred to as "uplink-downlink imbalance". However, this article concluded that "[t]hese findings do not motivate modification of the typically used downlink-based handover mechanisms", i.e., by considering uplink information in the handover mechanism.

As communication networks evolved, some networks shifted from a homogeneous design to a heterogeneous design, e.g., equipment such as micro-cells and pico-cells began to appear as neighboring base station cells to the macro-cell base stations. The characteristics of the different base station types in heterogeneous networks can vary significantly and, accordingly, heterogeneous networks present sometimes significant differences in the systematic imbalances between neighboring base stations or cells. These systematic imbalances can be caused by, for example, one or more of differing transmission power levels, differing numbers of transmitter and receiver antennas, different types of receivers and/or differing losses based on differing feeders in the neighboring base stations.

Accordingly, the provision of a better handover mechanism in heterogeneous networks which takes into account differences in the various equipment types which are present in heterogeneous networks is desirable.

SUMMARY

Embodiments provide for selective usage of uplink information in handover decisions based on, for example, differences in systematic imbalances between serving and neighboring base station(s). These embodiments can, for example, balance improved handover performance against increased signaling overhead associated with obtaining and using uplink information in the handover mechanism.

According to an exemplary embodiment, a method for handover of user equipment between base stations in a heterogeneous radio communication system includes determining a systematic imbalance difference between a serving base station in the heterogeneous network and a candidate base station in the heterogeneous network. If the systematic imbalance difference between the serving base station in the heterogeneous network and the candidate base station in the heterogeneous network exceeds a predetermined threshold, then uplink information associated with the user equipment is obtained and used to determine whether a combined downlink and uplink-based handover criterion is met. A handover procedure is initiated for the user equipment from the serving base station in the heterogeneous network to the candidate base station in the heterogeneous network based either: (a) on determining whether a downlink-based handover criterion is met if the systematic imbalance difference does not exceed the predetermined threshold, or (b) on the determining that the combined uplink and downlink-based handover criterion is met if the systematic imbalance difference exceeds the predetermined threshold.

According to another embodiment, a heterogeneous radio communication node includes a processor configured to determine a systematic imbalance difference between a serving base station in a heterogeneous network and a candidate base station in the heterogeneous network. The processor is further configured to determine whether the systematic imbalance difference between the serving base station in the heterogeneous network and the candidate base station exceeds a predetermined threshold. If the systematic imbalance difference between the serving base station in the heterogeneous network and the candidate base station in the heterogeneous network exceeds the predetermined threshold, then the processor is further configured to obtain uplink information associated with the user equipment and determine whether a combined downlink and uplink-based handover criterion is met. The node also includes a network interface configured to, in conjunction with the processor, initiate a handover procedure for the user equipment from the serving base station in the heterogeneous network to the candidate base station in the heterogeneous network based either: (a) on determining that a downlink only-based handover criterion is met if the systematic imbalance difference does not exceed the predetermined threshold, or (b) on the determining that the combined downlink and uplink-based handover criterion is met if the systematic imbalance difference exceeds the predetermined threshold.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
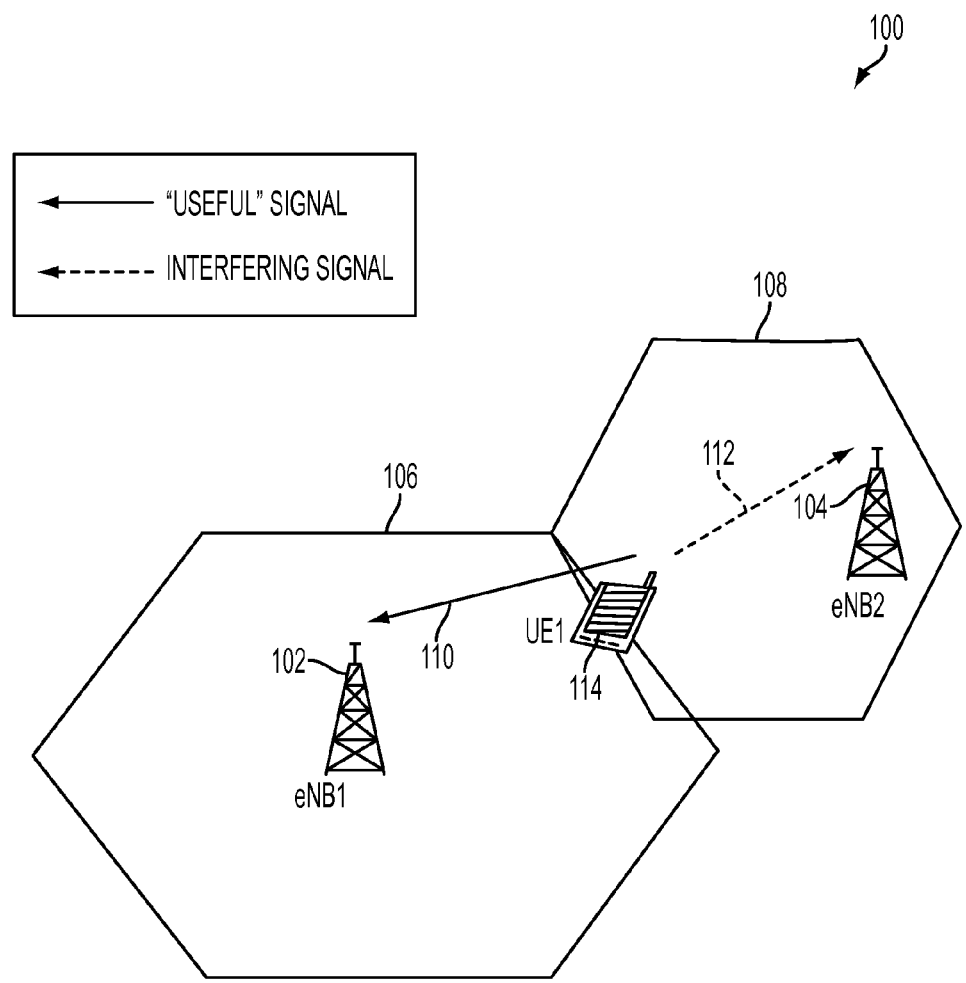
FIG. 1 depicts two differing cells of a heterogeneous network wherein a user equipment is at the boundary of the coverage areas of the two cells.

Looking first to FIG. 1, a heterogeneous network 100 of two neighboring base stations 102, 104 is depicted. As those skilled in the art will appreciate, a typical heterogeneous radio communication network will include more than two base stations, however only two are shown here to simplify the figure and description. It should also be noted in the exemplary embodiment of FIG. 1 that while in this example eNB1 102 is a macro base station and eNB2 104 is a micro base station, it will be appreciated that other types of base stations, e.g., pico base stations, etc., are also possible as neighboring base stations and that other neighboring base stations (not shown) surround eNB1 102 and eNB2 104. Of particular interest for the present discussion, eNB1 102 and eNB2 104 are different types of base stations, i.e., include one or more different components which impact their relative transmit and/or receive characteristics so as to generate a systematic imbalance there between, as discussed in more detail below.

Continuing with the exemplary embodiment of FIG. 1, the signal area of eNB1 102 is represented by the hexagonally shaped coverage area 106 and the signal area of eNB2 104 is represented by the hexagonally shaped coverage area 108, which coverage areas are sometimes also referred to as "cells". Next in the exemplary embodiment of FIG. 1, a user equipment 114, e.g., cell phone, laptop, TV, or any device which can be connected to a radio communication system, is currently attached to eNB1 102 as indicated by connection signal 110 but transmissions from user equipment 114 are receivable by, and interfere with, eNB2 104 as indicated by interference signal 112. In terms of nomenclature, eNB1 102 is sometimes referred to as the "serving base station" and eNB2 104 is sometimes referred to as a "neighboring base station" or a "candidate base station" in the context of handover procedures.

As mentioned above, the heterogeneous nature of the radio communication system of FIG. 1 gives rise to different systematic imbalances within the different cells of the system, such as cells 106 and 108. For example, a systematic uplink-downlink imbalance in each cell, e.g., cells 106 and 108, can be detected when the measurements of signal strengths, Signal to Interference and Noise Ratio (SINR), Signal to Leakage and Noise Ratio (SLNR), and/or Gain over Interference plus Noise Ratio (GINR) etc., are collected at the base station point where the impact of the Tower Mounted Amplifier (TMA) and feeder losses are included.

For example, consider an exemplary embodiment where the illustrated base stations in FIG. 1 are a macro base station eNB1 102 and an Open Access (OA) micro base station eNB2 104. In this exemplary embodiment, neighbor base stations eNB1 102 and eNB2 104 will typically display significant differences in terms of transmission power, the number of transmitter and receiver antennas, as well as the types of receivers. Further in the exemplary embodiment, it should be noted that in eNB1 102 (macro base station) the systematic uplink-downlink imbalance is high based on high fiber loss in connecting the antenna with the TMA at the point when the received SINR is measured at the base station and subsequently used for the decoding. Conversely in the exemplary embodiment, the eNB2 104 (OA micro base station) does not exhibit any systematic uplink-downlink imbalance because of the lack of a fiber-based antenna connection. Thus, this provides an example in which adjacent or neighboring cells in a heterogeneous radio communication network may exhibit a substantial difference in terms of the systematic uplink-downlink imbalance which those cells present to user equipment which are being served by those cells and/or which may be candidate cells for handover.

Exemplary embodiments propose the selective usage of uplink measurements for handover decisions in heterogeneous radio communication systems. More specifically, according to exemplary embodiments, when the difference in the systematic imbalance between a serving cell and one or more neighbor cells is greater than a predefined threshold, the exemplary embodiment extends the handover mechanism to include uplink measurements. Alternatively, when the systematic imbalance between the serving cell and one or more neighbor cells does not exceed the predefined threshold, the handover decision can be made solely based on downlink measurements. It should be noted in the exemplary embodiment that the uplink measurements can include, but are not limited to, one or more of SINR, SLNR or GINR information. It should further be noted that methods and structures for measuring SINR, SLNR, GINR, etc. are known by one skilled in the art and are only briefly discussed below to provide context.

SINR for the uplink can be measured or estimated at the base station using the received signal strength from the uplink pilot channels. For example, in a Long Term Evolution (LTE) network, the uplink pilot channels are either the uplink sounding reference signals, or the uplink demodulation reference signals for either the Physical Uplink Shared Channel (PUSCH) or the Physical Uplink Control Channel (PUCCH), as described in 3$^{rd}$ Generation Partnership Project (3GPP) Technical Specification (TS) section 36.211. SINR can be estimated by combining the measurements on the reference signals and the measurements of the total received interference in the uplink at the base station. Applying appropriate filters and processing at the base station, the interference on the reference signals $I_{RS}$ is estimated by subtracting the power received from the reference signals $P_{RC}$ from the total interference received $I_{TotalRC}$ received on the same Single-Carrier Frequency Division Multiple Access (SC-FDMA) symbols where uplink reference signals are transmitted:

$$I_{RS} = I_{TotalRC} - P_{RC} \quad (1)$$

and the uplink SINR at the reference signals $SINR_{RC}$ can be estimated by the equation:

$$SINR_{RC} = P_{RC}/(I_{RS}+N) \quad (2)$$

where N is the thermal noise present with the received reference signals.

Alternatively, or additionally, SLNR can be measured for uplink signals. For SLNR measurement, the leakage to other base stations can be estimated by measuring the uplink interference at the neighbor base stations which are affected by the uplink transmissions of the users within the subject cell. As yet another alternative, or in addition to SINR and/or SLNR measurements, GINR for the uplink can be determined. The GINR is the ratio of the uplink path loss to the interference plus noise. It should be noted that no UE uplink power is considered in the GINR measurement.

The measurement or detection of systematic imbalance in each cell can be made, for example, when base stations are brought online in a heterogeneous radio communication system, when changes are made to a base station, and/or periodically to take into account that some base station components' radio characteristics may vary over time. According to an embodiment, each base station, e.g., eNB1 102 and eNB 104, can store values associated with its own systematic imbalance, as well as that of each of its neighboring cells, for use in determining when to incorporate uplink information into its handover mechanism. These imbalance values, which can be specified in a number of decibels (dBs), can be updated periodicially and exchanged with other base stations, so that the stored systematic imbalance values are accurate when they are used in ongoing determinations associated with handover decisions as will be described next below. Exemplary techniques for exchanging systematic imbalance values are described, for example, in U.S. Published Patent Application 2010/0184437, to Konstantinos Dimou et al., published on Jul. 22, 2012, the disclosure of which is incorporated here by reference.

When triggered due to a sufficient difference in systematic imbalances, including these uplink measurements and calculations into the handover decisions according to exemplary embodiments involves, for example, their incorporation into existing events triggering mobility procedures. For example, an existing downlink-based event or criteria for triggering a mobility procedure, as described in section 5.5.4.4 of the 3GPP TS 36.331, states that when the Reference Signal Received Power (RSRP), or the Reference Signal Received Quality (RSRQ), from a neighbor cell $RSRP_{Neighbor}$ is greater than a quantity of a RSRP, or RSRQ, from a serving cell $RSRPs_{Serving}$ plus a Handover Hysteresis (HO) plus an Offset, i.e., when $$RSRP_{Neighbor} \geq RSRP_{Serving} + HO_{Hysteresis} + \text{Offset}, \quad (3)$$

then a handover from the serving cell to that neighbor cell is triggered (initiated). According to an exemplary embodiment, an uplink-based event or criteria for triggering a mobility procedure can be used in addition to the foregoing downlink-based criteria such as:

$$SINR_{Neighbor} \geq SINR_{Serving} + HO_{Hysteresis} + \text{Offset} \quad (4)$$

wherein a handover event is triggered when both the downlink based event and the uplink based event are true, i.e., when both equations (3) and (4) are satisfied. It should be noted in the exemplary embodiment that the uplink based event represented by the exemplary equation (4) can be based on other measurements such as, but not limited to, SLNR and GINR, or can be entirely different equations. Numerous variants are contemplated.

For example, in another aspect of the exemplary embodiment, the uplink based event or trigger can be based on selective combinations of measurements associated with an uplink signal, i.e., SINR, SLNR, and/or GINR, received signal strength in the uplink, etc. In a further aspect of the exemplary embodiment, the uplink and downlink triggering events can have different weighting factors applied before comparing the results to a threshold triggering value. For example, a handover triggering event could occur when:

$$ax + by \geq \text{Threshold} \quad (5)$$

where "x" and "y" are binary values taking the value of either zero (0) or one (1), depending on whether the uplink or downlink equations, e.g., equations (3) and (4), are satisfied respectively and "a" and "b" are different weighting factors. In this context, a determination of whether the downlink-based criteria and the uplink-based criteria are met is performed jointly by, e.g., evaluating equation (5), to determine whether to initiate the handover process. In another aspect of the exemplary embodiment, the weighting factor assigned to the uplink-based criteria can be based on the UE location.

According to other embodiments, different handover hysteresis values and different offsets can be used in the downlink-based criteria and uplink-based criteria. In a further aspect of the embodiments, different weights in the uplink measurements are used for indoor/outdoor distributed antenna systems because of the different size and types of feeders and accordingly, different levels of systematic uplink-downlink imbalance.

According to other embodiments, uplink measurements are used with specific weighting factors in the mobility decision based on a shared cell concept. For example, a common cell identity is shared between cells within a predefined geographic area wherein these cells could be, but are not limited to, a large macro cell and a number of pico cells controlled by a macro base station or a number of surrounding interconnected pico base stations. Under the circumstances of this common cell exemplary embodiment, the pico cells associated with the common cell identity could have a greater weighting factor in the handover decision algorithm than similar pico cells which are not associated with the common cell identity, thus extending the range and allowing easier attachment to the pico cells in the common cell arrangement.

As yet another alternative, different weighting factors in the uplink measurements can be used for different carriers in systems which employ carrier aggregation, such as LTE systems. For example, suppose that an operator reserves different carriers for users communicating at different speeds wherein the higher speed users have a greater probability to attach to macro cells than to pico cells and, conversely, the lower speed users have a greater probability to attach to pico cells than to macro cells based on the different weights of uplink measurements in handover decisions. In another carrier aggregation embodiment, overlap of cells with different coverage areas or quality if signal at the cell edge, resulting in a systematic imbalance at the cell edge, based on different carrier frequencies, can have different thresholds base on the carrier frequency. For example, the threshold for a handover would be higher for the lower frequency component carrier.

Having discussed various usages of uplink measurements, estimates or more generally "uplink information" in making handover decisions, the discussion now turns again to the selective nature of the usage of uplink information in making handover decisions in heterogeneous networks according to these embodiments. For example, according to an embodiment, an uplink measurement will be considered as part of the handover decision making process only when a particular pair of serving and neighbor cells exhibit sufficiently different value(s) in terms of cell specific systematic uplink-downlink imbalance, e.g., which can occur when one cell is a macro cell and the other cell is a pico cell. Stated differently, uplink information is considered in the handover mechanism when the difference between a systematic-imbalance associated with a serving base station or cell and the systematic imbalance associated with a candidate (neighbor) base station or cell exceeds a predetermined threshold.

Figure 2:
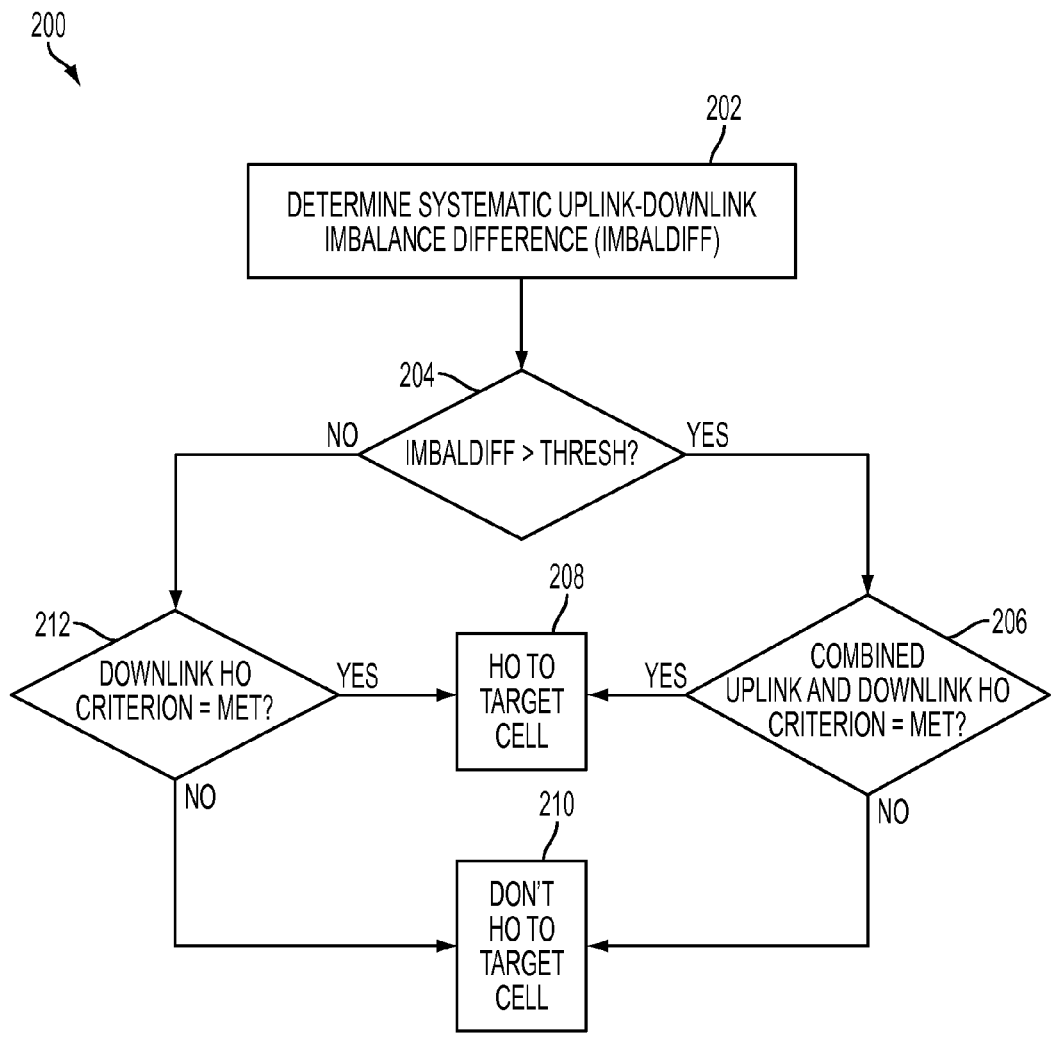
FIG. 2 depicts a flowchart of a method for determining if uplink information should be included in a user equipment handover decision and if so, making the decision based on both downlink and uplink information according to an embodiment.

To better under understand this, and other, aspects of the embodiments and looking now to FIG. 2, a flowchart for an exemplary method embodiment 200 of a method for handover of user equipment in a heterogeneous radio communication network is depicted therein. Therein, at step 202, the systematic uplink-downlink imbalance difference between the serving cell or base station and the target cell or base station is determined. This can be accomplished in any desired manner, e.g., by obtaining a previously calculated and stored value or by obtaining new information associated with the systematic imbalance difference and calculating the systematic imbalance difference. As shown in step 204, if a systematic imbalance difference between a serving base station in the heterogeneous network and a candidate base station in the heterogeneous network exceeds a predetermined threshold, then it is determined whether a combined uplink-based and downlink-based handover criterion is met, e.g., that specified in equation (4) above or another combined uplink-based/downlink-based handover criterion, as shown in step 206 If the combined uplink and downlink handover (HO) criterion is met, then a handover can be initiated toward the target or candidate base station or cell (step 208), otherwise a handover to that candidate or target is not performed (step 210).

The selective usage of uplink information in the handover mechanism according to these embodiments is illustrated in steps 206 and 212. If the result of the threshold check performed in step 204 is negative, i.e., the systematic imbalance difference is less than the threshold (THRESH), then the flow proceeds to step 212. Therein, it is determined whether a downlink only-based handover criterion is met, e.g., that specified in equation (3) above or another downlink only-based handover criterion. If the downlink only-based HO criterion is met, then a handover can be initiated toward the target or candidate base station (step 208), otherwise a handover to that candidate or target is not performed (step 210).

Thus, as illustrated in the exemplary embodiment of FIG. 2, a handover procedure for the user equipment from the serving base station in the heterogeneous network to the candidate base station in the heterogeneous network is initiated based either: (a) only on the determination that a downlink handover criteria is met if the systematic imbalance difference does not exceed the predetermined threshold, or (b) on the determination that a combined downlink and uplink handover criteria is met is met if the systematic imbalance difference exceeds the predetermined threshold.

Various implementations of the embodiment of FIG. 2 are contemplated. For example, note that the steps illustrated in FIG. 2 need not necessarily be performed in the order illustrated. Additionally, the collection of uplink information can be performed at any time as part of the step 206 determination.

Moreover, the selective collection and usage of uplink information in the handover mechanism can be associated only with a candidate or neighboring cell for which the systematic imbalance difference exceeds the predetermined threshold. Alternatively, if the systematic imbalance difference associated with any one (or more) of the cells in a neighbor list which are candidates for handover exceeds the threshold, then uplink information may be collected and used to evaluate all of the handover candidates in any of the aforedescribed manners.

The method illustrated in FIG. 2, or other methods according to these embodiments can be performed by the node in the heterogeneous radio communication system which is responsible for making handover decisions. Depending upon the type of radio communication in which embodiments are implemented, this node can, for example, be a core network node or the serving base station. Thus, all of the steps illustrated in FIG. 2 can, for example, be performed by element(s) of either a core network node or a serving base station. An exemplary base station is illustrated and described below with respect to FIG. 5.

Figure 3:
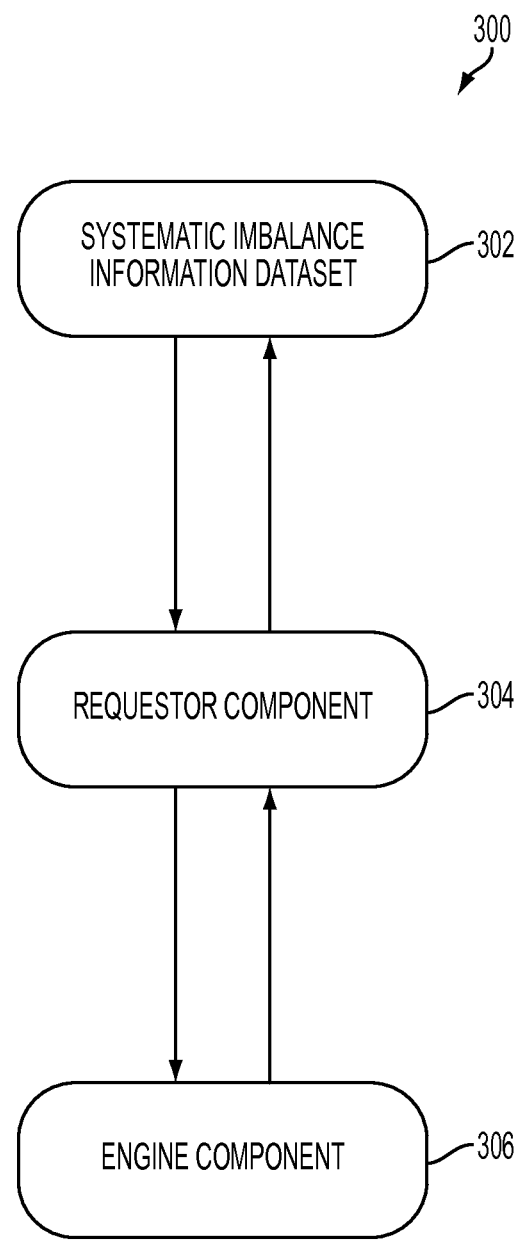
FIG. 3 depicts a schematic of a downlink-uplink handover event system for determining if uplink information should be included in a user equipment handover decision and if so, making the decision based on both downlink and uplink information according to an embodiment.

As a purely illustrative example of how a node can implement embodiments described herein, and turning now to FIG. 3, an exemplary embodiment of a systematic imbalance based downlink-uplink handover event generator 300 is depicted. The systematic imbalance based downlink-uplink handover event generator 300 in this embodiment includes a systematic imbalance dataset 302, a requestor component 304 and an engine component 306. In one aspect of exemplary embodiment 300, the systematic imbalance information dataset 302 contains information allowing the determination of the systematic imbalance difference between a serving cell and one or more neighboring or candidate cells. Continuing with the exemplary embodiment, the systematic imbalance information dataset 302 can be semi-static and unique for each cell and is based, at least in part, on the type and configuration of the cell, i.e., each cell has its own systematic imbalance information dataset 302. In this example, the dataset 302 is said to be semi-static as it is likely to be updated somewhat less frequently than handover decisions are being made, however this characteristic is not a requirement of the invention. As mentioned above, various mechanisms are available for obtaining information associated with the systematic imbalance information of neighboring cells/base stations, which information can be used to update the dataset 302, which can be stored in a memory device of the responsible handover decision node.

Next in the exemplary embodiment, the requestor component 304 is responsible for requesting/updating the systematic imbalance information dataset 302 for the neighboring cell(s) of interest. Continuing with the exemplary embodiment, the requestor component 304 forwards the systematic imbalance information dataset 302 to the engine component 306 for further processing. It should be noted in the exemplary embodiment that the requestor component 304 may request systematic imbalance information datasets from other neighboring cells not currently identified in a neighbor cell list or handover candidate list associated with a particular UE. It should further be noted that because the systematic imbalance information for each cell is typically static or semi-static, the systematic imbalance information dataset 302 can comprise the result of a comparison between the serving cell's systematic imbalance and the neighboring cell's systematic imbalance or the serving cell can maintain the results of the comparison or difference between systematic imbalances of any given cells until such time as, for example, a type or configuration change occurs at the serving cell or the neighboring cell.

Continuing with the exemplary embodiment, the engine component 306 processes the systematic imbalance information dataset 302 provided by the requestor component 304 to determine if a preconfigured threshold value is exceeded. In this embodiment, the engine component 306 compares the systematic imbalance information dataset 302 from the neighboring cell to the systematic imbalance information dataset 302 associated with the serving cell containing the engine component 306 to determine if the preconfigured threshold is exceeded. If the preconfigured threshold is exceeded, then the engine component 306 collects uplink information for determining if an uplink-based triggering event has occurred. It should be noted that, at least for this embodiment, if the preconfigured threshold for the systematic imbalance has been exceeded and the uplink-based triggering event has not occurred then the handover event for the user equipment from the serving cell to the neighboring cell will not occur even if the downlink-based triggering event has occurred.

Figure 4:
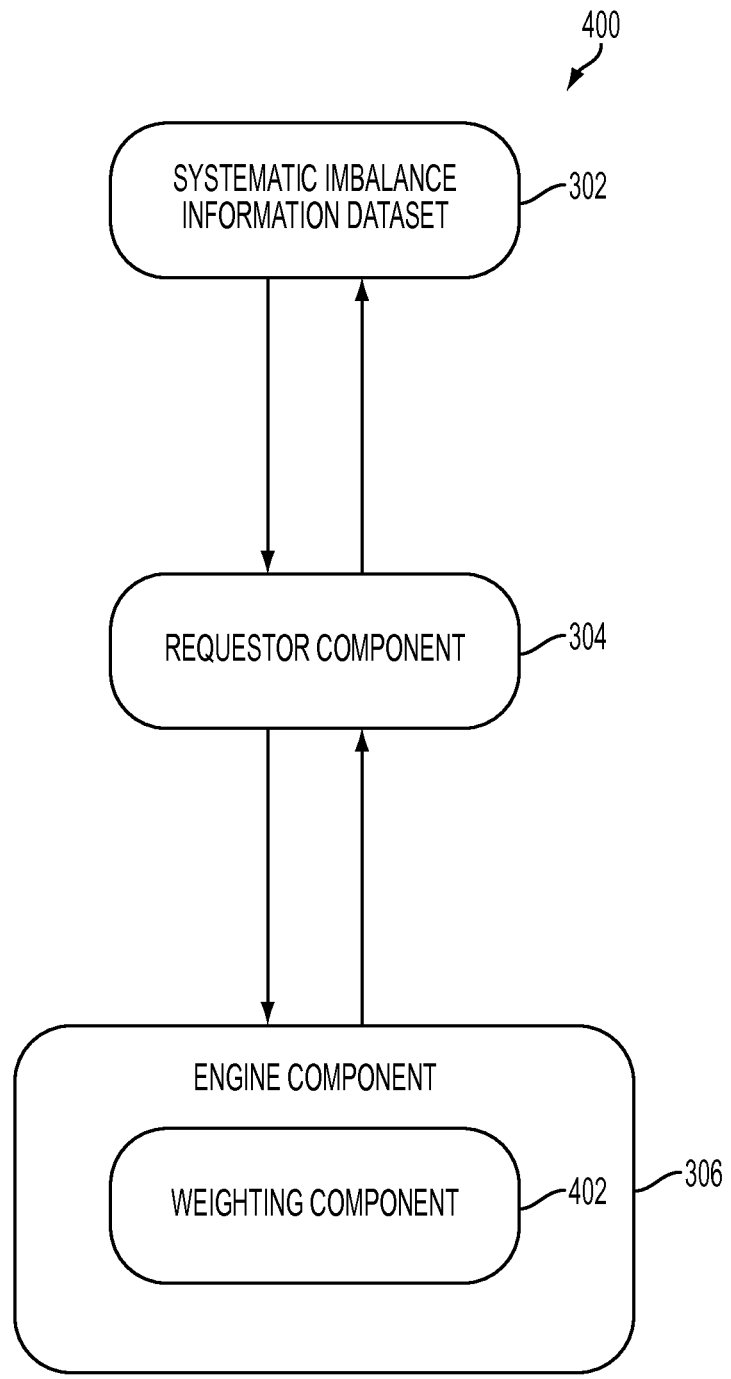
FIG. 4 depicts a schematic of a downlink-uplink handover event system for determining if uplink information should be included in a user equipment handover decision and if so, making the decision based on both downlink and uplink information and a weighting component for tuning the handover decisions based on cell characteristics according to an embodiment.

Turning now to FIG. 4, another exemplary implementation of the afore-described methods for performing handover in heterogeneous networks is illustrated. Therein, an exemplary embodiment of a systematic imbalance based downlink-uplink handover event generator 400 is depicted, wherein components 302, 304 and 306 operate substantially as described above with respect to the embodiment of FIG. 3, with exceptions noted below. In this embodiment, the engine component 306 includes a weighting component 402. The weighting component 402 applies different weights to the downlink measurements and the uplink measurements based on, for example, characteristics of the serving cell and the neighboring or candidate cell. Various examples were described above, some of which include: the greater the systematic imbalance between the serving cell and the neighboring cell, the greater the weighting factor placed on the uplink measurements, specific combinations of cell types, i.e., a macro serving cell and a pico neighboring cell would result in a greater weighting factor placed on the uplink measurements while a pico serving cell to a pico neighboring cell would result in a smaller weighting factor on the uplink measurements, in configurations using carrier aggregation a carrier assigned higher speed traffic would result in a greater weighting factor on uplink measurements while a carrier assigned lower speed traffic would result in a smaller weighting factor for the uplink measurements, and specific user equipment geographic locations can result in predefined weightings for uplink measurements.

Figure 5:
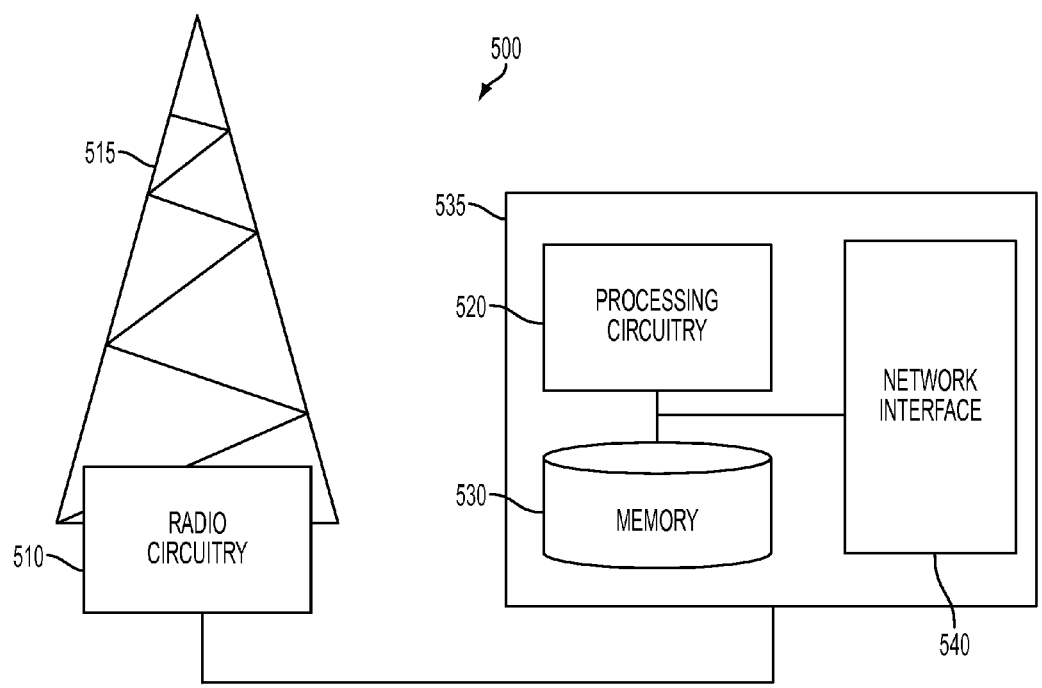
FIG. 5 depicts an exemplary base station for implementing a downlink-uplink systematic imbalance handover event system according to various embodiments.

FIG. 5 illustrates an example of a base station 500 in which these embodiments can be implemented, although as made clear above, a base station is only one example of a suitable node in which such embodiments can be implemented. This exemplary base station 500 includes radio circuitry 510 operatively connected to one or more antennas (or antenna arrays) 515 and to processing circuitry 520 and memory 530, which are disposed within a housing 535. In some variants, the radio circuitry 510 is located within the housing 535, whereas in other variants, the radio circuitry 510 is external to the housing 535. A network interface 540 is provided to enable the base station 500 to communicate with other network nodes (not shown), including other base stations. The processing circuitry 520 is configured to transmit and receive, for example and via the radio circuitry 510, radio signals toward and from UEs (not shown), and can include one or more processors.

Base station 500 can include a variety of computer readable media. Computer readable media can be any available media that can be accessed by processing circuitry 520. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by processing circuitry 520. Communication media can embody computer readable instructions, data structures, program modules and can include any suitable information delivery media.

The above-described exemplary embodiments are intended to be illustrative in all respects, rather than restrictive, of the present innovation. Thus the present innovation is capable of many variations in detailed implementation that can be derived from the description contained herein by a person skilled in the art. For example, the foregoing discusses selective usage of uplink information when a predetermined threshold is exceeded. Those skilled in the art will appreciate that other implementations could involve using a threshold condition implemented such that the trigger occurs when the difference is equal to or greater than a threshold, less than a threshold, less than or equal to a threshold, etc., rather than greater than the threshold. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method for handover of user equipment between base stations in a heterogeneous radio communication system, the method comprising:
   determining a systematic imbalance difference between a serving base station in the heterogeneous network and a candidate base station in the heterogeneous network;
   if the systematic imbalance difference between the serving base station in the heterogeneous network and the candidate base station in the heterogeneous network exceeds a predetermined threshold, then obtaining uplink information associated with the user equipment and determining whether a combined downlink and uplink-based handover criterion is met;
   initiating a handover procedure for the user equipment from the serving base station in the heterogeneous network to the candidate base station in the heterogeneous network when the systematic imbalance difference does not exceed the predetermined threshold and a downlink only-based criterion is met; and
   initiating a handover procedure for the user equipment from the serving base station in the heterogeneous network to the candidate base station in the heterogeneous network when the systematic imbalance difference exceeds the predetermined threshold and the combined downlink- and uplink based handover criterion is met, wherein:
   a first systematic imbalance is a difference in an average path gain in a downlink and an uplink associated with the serving base station and
   a second systematic imbalance is a difference in an average path gain in a downlink and an uplink associated with the candidate base station, and the systematic imbalance difference is a difference between the first systematic imbalance and the second systematic imbalance.

2. The method of claim 1, wherein
the serving base station in the heterogeneous network differs relative to the candidate base station in the heterogeneous network in terms of one or more of: transmission power levels, number of transmitter antennas, number of receiver antennas, types of receivers and losses associated with feeders.

3. The method of claim 1, wherein the uplink information comprises:
at least one of Signal to Interference and Noise Ratio (SINR) information, Signal to Leakage and Noise Ratio (SLNR) information and Gain over Interference plus Noise Ratio (GINR) information.

4. The method of claim 1, wherein
the downlink only-based handover criterion is met when a Reference Signal Received Power (RSRP) measurement of the candidate base station is greater than or equal to a sum of a RSRP measurement of the serving base station, a handover hysteresis value and a predefined offset value.

5. The method of claim 3, wherein
the uplink information is SINR information and an uplink-based handover criterion portion of the combined uplink and downlink-based handover criterion is met when a Signal to Interference and Noise Ratio (SINR) measurement of the candidate base station is greater than or equal to a sum of a SINR measurement of the serving base station, a handover hysteresis value and a predefined offset value.

6. The method of claim 1, wherein
a first handover hysteresis value associated with determining whether the downlink only-based criteria is met, and a second handover hysteresis value associated determining whether an uplink component of the combined downlink and uplink-based criterion is met, have different values.

7. A heterogeneous radio communication node comprising:
a processor configured
to determine a systematic imbalance difference between a serving base station in a heterogeneous network and a candidate base station in the heterogeneous network, and
to determine whether the systematic imbalance difference between the serving base station in the heterogeneous network and the candidate base station exceeds a predetermined threshold;
wherein if the systematic imbalance difference between the serving base station in the heterogeneous network and the candidate base station in the heterogeneous network exceeds the predetermined threshold, then the processor obtains uplink information associated with the user equipment and determines whether a combined downlink and uplink-based handover criterion is met;
a network interface configured to, in conjunction with the processor, initiate a handover procedure for the user equipment from the serving base station in the heterogeneous network to the candidate base station in the heterogeneous network when the systematic imbalance difference does not exceed the predetermined threshold and a downlink only-based handover criterion is met; and
the network interface configured to, in conjunction with the processor, initiate a handover procedure for the user equipment from the serving base station in the heterogeneous network to the candidate base station in the heterogeneous network when the systematic imbalance difference exceeds the predetermined threshold and the combined downlink and uplink-based handover criterion is met, wherein
a first systematic imbalance is a difference in an average path gain in a downlink and an uplink associated with the serving base station and a second systematic imbalance is a difference in an average path gain in a downlink and an uplink associated with the candidate base station, and the systematic imbalance difference is a difference between the first systematic imbalance and the second systematic imbalance.

8. The heterogeneous radio communication node of claim 7, wherein
the serving base station in the heterogeneous network differs relative to the candidate base station in the heterogeneous network in terms of on one or more of: transmission power levels, number of transmitter antennas, number of receiver antennas, types of receivers and losses associated with feeders.

9. The heterogeneous radio communication node of claim 7, wherein the uplink information comprises one of: Signal to Interference and Noise Ratio (SINR) information, Signal to Leakage and Noise Ratio (SLNR) information and Gain over Interference plus Noise Ratio (GINR) information.

10. The heterogeneous radio communication node of claim 7, wherein the heterogeneous radio communication node is a base station.

11. A method for handover of user equipment between base stations in a heterogeneous radio communication system, the method comprising:
determining a systematic imbalance difference between a serving base station in the heterogeneous network and a candidate base station in the heterogeneous network;
if the systematic imbalance difference between the serving base station in the heterogeneous network and the candidate base station in the heterogeneous network exceeds a predetermined threshold, then obtaining uplink information associated with the user equipment and determining whether a combined downlink and uplink-based handover criterion is met;
initiating a handover procedure for the user equipment from the serving base station in the heterogeneous network to the candidate base station in the heterogeneous network when the systematic imbalance difference does not exceed the predetermined threshold and a downlink only-based criterion is met;
initiating a handover procedure for the user equipment from the serving base station in the heterogeneous network to the candidate base station in the heterogeneous network when the systematic imbalance difference exceeds the predetermined threshold and the combined downlink- and uplink based handover criterion is met, wherein:
the combined downlink and uplink-based handover criterion is a weighted sum associated with the downlink-only based handover criterion and an uplink-based handover criterion, and
the weighted sum includes a first value comprising a first weighting value multiplied by a value indicating whether the downlink only-based handover criteria is met and a second value comprising a second weighting value multiplied by a value indicating whether the uplink-based handover criteria is met.

12. The method of claim 11, wherein
a magnitude of the second weighting value is related to a magnitude of the systematic imbalance between the serving base station and the candidate base station.

13. The method of claim 11, wherein
the first weighting value is based on an antenna configuration associated with the serving base station and the second weighting value is based on an antenna configuration associated with the neighboring base station.

14. The method of claim 11, wherein
the first weighting value and the second weighting value are based on the serving base station and the candidate base station being members of a predefined shared cell.

15. The method of claim 14, wherein
the second weighting value is greater for the candidate base station when the candidate base station and the serving base station are members of the predefined shared cell.

16. The method of claim 11, wherein
a different first weighting value and second weighting value are configured for each carrier if the heterogeneous radio communication network employs carrier aggregation.

17. The method of claim 16, wherein
the different first and second weighting values are based on a frequency associated with each component carrier.

18. A heterogeneous radio communication node comprising:
a processor configured
to determine a systematic imbalance difference between a serving base station in a heterogeneous network and a candidate base station in the heterogeneous network, and
to determine whether the systematic imbalance difference between the serving base station in the heterogeneous network and the candidate base station exceeds a predetermined threshold;
wherein if the systematic imbalance difference between the serving base station in the heterogeneous network and the candidate base station in the heterogeneous network exceeds the predetermined threshold, then the processor obtains uplink information associated with the user equipment and determines whether a combined downlink and uplink-based handover criterion is met;
a network interface configured to, in conjunction with the processor, initiate a handover procedure for the user equipment from the serving base station in the heterogeneous network to the candidate base station in the heterogeneous network when the systematic imbalance difference does not exceed the predetermined threshold and a downlink only-based handover criterion is met;
the network interface configured to, in conjunction with the processor, initiate a handover procedure for the user equipment from the serving base station in the heterogeneous network to the candidate base station in the heterogeneous network when the systematic imbalance difference exceeds the predetermined threshold and the combined downlink and uplink-based handover criterion is met, wherein:
the combined downlink and uplink-based handover criterion is a weighted sum associated with the downlink only-based handover criterion and an uplink-based handover criterion, and
the weighted sum includes a first value comprising a first weighting value multiplied by a value indicating whether the downlink-only based handover criteria is met and a second value comprising a second weighting value multiplied by a value indicating whether the uplink-based handover criteria is met.

19. The heterogeneous radio communication node of claim 18, wherein
the first weighting value is based on an antenna configuration associated with the serving base station and the second weighting value is based on an antenna configuration associated with the neighboring base station.

20. The heterogeneous radio communication node of claim 18, wherein the first weighting value and the second weighting value are based on the serving base station and the candidate base station being members of a predefined shared cell.

21. The heterogeneous radio communication node of claim 20, wherein the second weighting value is greater for the candidate base station when the candidate base station and the serving base station are members of the predefined shared cell.

22. The heterogeneous radio communication node of claim 20, wherein a different first weighting value and second weighting value are configured for each carrier if the heterogeneous radio communication network employs carrier aggregation.

23. The heterogeneous radio communication node of claim 18, wherein a magnitude of the second weighting value is related to a magnitude of the systematic imbalance between the serving base station and the candidate base station.

* * * * *